DRAFTING PEN

Original Filed March 6, 1969

INVENTOR.
Carlton M. DiCarlo
BY
Johnson and Kline
ATTORNEYS

United States Patent Office

Re. 28,123
Reissued Aug. 20, 1974

28,123
DRAFTING PEN

Carlton M. Di Carlo, 3 Station Road,
Madison, N.J. 07940

Original No. 3,594,092, dated July 20, 1971, Ser. No. 804,810, Mar. 6, 1969. Application for reissue Dec. 21, 1972, Ser. No. 317,110
Int. Cl. B43k *1/10*
U.S. Cl. 401—258 10 Claims

Matter enclosed in heavy brackets [ ] appears in the original patent but forms no part of this reissue specification; matter printed in italics indicates the additions made by reissue.

ABSTRACT OF THE DISCLOSURE

A reservoir drafting pen comprising a barrel having an ink storage portion and a tubular pen point at one end communicating therewith and an inner member having a stem capable of reciprocation and having a needle adapted to clean the tubular pen point and having a control member providing a novel vent and ink leakage control means, including a helical thread, for the pen. The drafting pen is easy to construct and assemble, easy to fill and clean or change the color of ink, cannot bleed through the tubular tip, and provides a uniform flow of ink.

Heretofore, in reservoir drafting pens of the present type it was necessary to shake the device vigorously until the ink appeared. This frequently caused ink to splatter about. If the pen was not used for a few minutes or so, the shaking operation would have to be repeated. If the ink flow was sluggish or the ink became dry, or if the usual vent became plugged with ink which dried, it was necessary to soak the device in cleaning fluid overnight, or longer and disassemble the parts and immerse the parts in cleaning fluid and then rinse in water. Since the usual vent leads into the threaded connection of the parts, the vigorous shaking of the pen causes the ink to flow along the vent and into the threads. If this ink is not removed and is allowed to dry completely, it will prevent disassembly of the pen and requires that the pen be returned to the manufacturer.

The present invention overcomes these difficulties by providing a device which is easy to assemble, easy to fill with ink, is readily cleansed of dried ink that forms at the writing tip and in which the ink flow is controlled during use.

A feature of the invention resides in the fact that the tubular pen point can be cleaned of dried ink without the necessity of vigorous shaking and the device can be cleaned without the requirement of soaking the pen overnight or longer.

Further, the pen cannot bleed through the tubular tip as occurs with pens heretofore used when the vent becomes clogged. Also, the tendency of the ink to dry in the pen during storage for future use is eliminated because of double seals for the ink storage portion.

Another feature of the invention is the novel control means which acts as an air vent and also prevents ink from passing to an upper portion of the pen and the vent therefor.

A still further feature resides in the cleaning needle having a helical groove in its outer surface. This permits a rapid flow of ink to the pen point and the edges of the groove act to scrape the dry ink from the tubular pen point during the cleaning operation.

Other features and advantages of the invention will be apparent from the specification and claims when considered in connection with the accompanying drawings in which:

Figure 1:
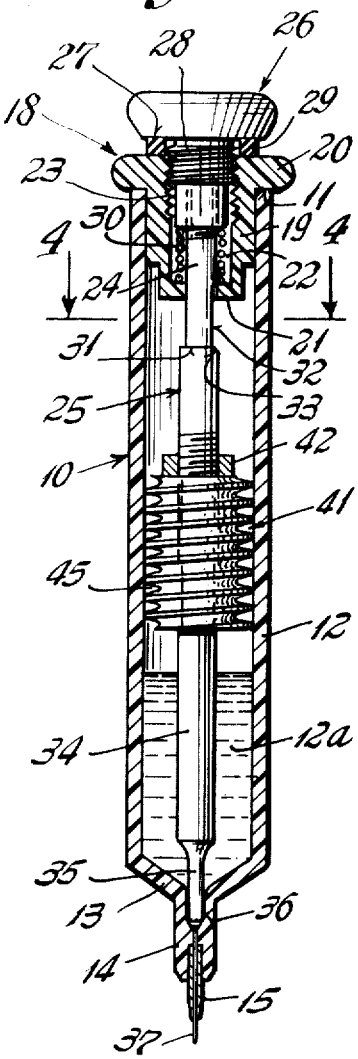
FIG. 1 shows a longitudinal sectional view of the drafting pen in its nonwriting position.

As shown in the drawing, the drafting pen comprises a tubular barrel 10 having an open upper end 11 and a lower portion 12 constituting an ink storage portion which is closed by a lower wall 13 having a projecting portion 14 of reduced diameter provided with a tubular pen point 15 having a passage 16 communicating with the ink storage portion of the barrel.

The barrel is preferably formed of a transparent or translucent thermoplastic moldable material, such as a polypropylene or the like, which will permit visual inspection of the quantity and color of the ink 12a stored in the lower ink storage portion 12 of the barrel.

Figure 3:
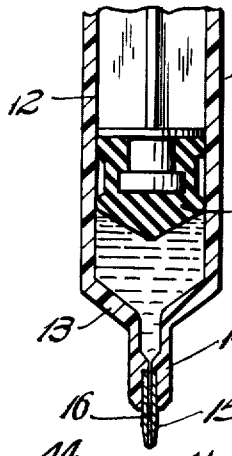
FIG. 3 shows a fragmentary view of the pen with the filling plunger in position to fill the ink storage portion.

To fill the ink storage portion of the barrel, a plunger device 17 (FIG. 3) is inserted into the barrel through the open end 11. The pen point is inserted into a supply of ink (not shown) and the plunger device withdrawn, causing the required amount of ink, which is the usual drafting ink such as India ink, to be drawn into the storage portion of the barrel.

When this has been accomplished, the pen point is removed from the ink supply and the plunger removed from the barrel. This operation can be followed to draw in water when it is desired to clean the storage portion as an incident to changing the color of the ink in the pen. After the storage portion is filled with ink, an inner member 18 is inserted into the barrel.

The inner member 18 comprises a bushing 19 having a flange 20 which engages the end of the barrel when the bushing is inserted therein with a tight fit to close said open end 11. The bushing has an inner apertured wall 21 communicating with an enlarged bore 22. The outer end of the bore 22 is threaded at 23. The apertured wall of the bushing slidably supports the upper end portion 24 of a stem 25. The end of the stem has a button 26 secured thereon, the button having an outer flange 27 and a threaded shank 28 adapted to be threaded into the threads 23 of the bore. Preferably, a sealing washer 29 is disposed between the outer flange 27 and the end of the bushing 19 to seal the outer end of the barrel when the button is threaded into the sealing position of FIG. 1.

Figure 4:
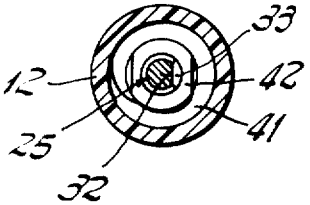
FIG. 4 is a sectional view taken along line 4—4 of FIG. 1.

A spring 30 is located in the bore 22. Its ends bear against the wall 21 and the shank 28 and normally urge the stem outward to the outer position of FIG. 2 when the threads 28 are released, in which position a shoulder 31 on the stem engages the wall 21. It will be noted that a portion of the stem above the shoulder 31 has a vent passage 32 formed therein communicating with the bevel 33 on the shoulder 31 (FIGS. 1 and 4) so as to vent the upper end of the barrel when the stem is in the outer position.

Figure 5:
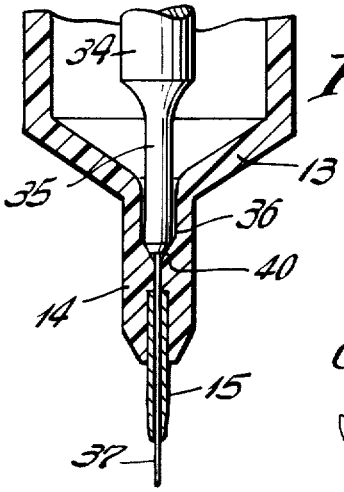
FIG. 5 is an enlarged view of the pen portion of the device as shown in FIG. 1.
Figure 7:
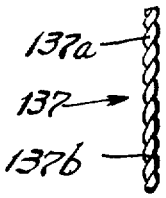
FIG. 7 is a view of another form of cleaning needle.

The lower end 34 of the stem 25 has a portion 35 of reduced diameter which, in the position of FIGS. 1 and 5, is adapted to be disposed within bore 36 of the portion 14. The end of the portion 35 has a cleaning needle 37 which passes through the bore 16 in the pen point 15 in the sealing position of the stem. The needle 37 can have a smooth surface 37a as shown in FIGS. 1, 2, 3 and 5 or, as shown in FIG. 7, needle 137 can have a longitudinally extending helical groove 137b in the surface 137a. Such a groove can be formed in the manner of a groove in a twist drill or by twisting a flat ribbon about its longitudinal axis. In some circumstances the latter construction is preferred since it has been found to permit a rapid flow of ink to the tubular pen point and the edges of the grooves aid in scraping dry ink from within the tubular pen point.

Figure 2:
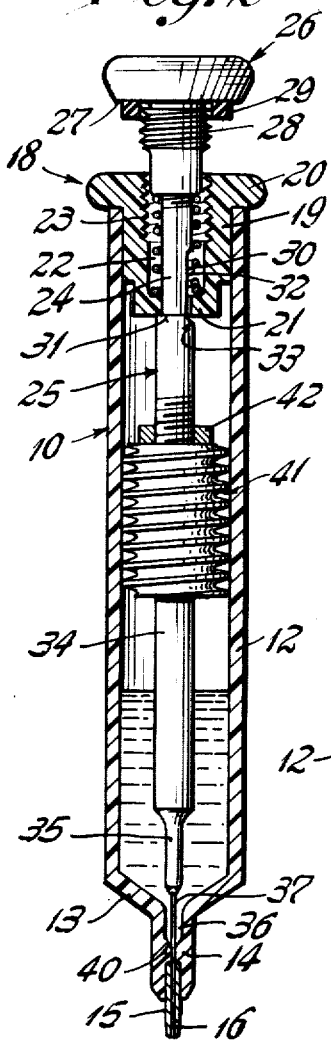
FIG. 2 is a view similar to FIG. 1 with the drafting pen in writing position.

When the stem is in the writing or outer position, as shown in FIG. 2, the needle is in retracted position within the pen point. When it is desired to start the ink flow or to clean the pen point, it is merely necessary to reciprocate the stem several times by applying pressure to the projecting button. The needle will function to clean the bore even though it is slightly smaller than said bore; for example, there is a space between the needle and the bore 16 of approximately 0.00125 inches.

To facilitate the insertion of the inner member into the barrel, the button is threaded to sealing position in the bushing and the walls of the bore 36 are inclined as at 40 (FIG. 5) to guide the needle into the bore 16 in the tubular pen point.

Intermediate the ends of the stem and located above the ink storage portion 12 of the barrel is a control means to prevent ink from passing above it into the cavity in the upper end of the barrel which includes a helical thread having a slight pitch and a cooperating cylindrical wall on the control means and barrel.

Figure 6:
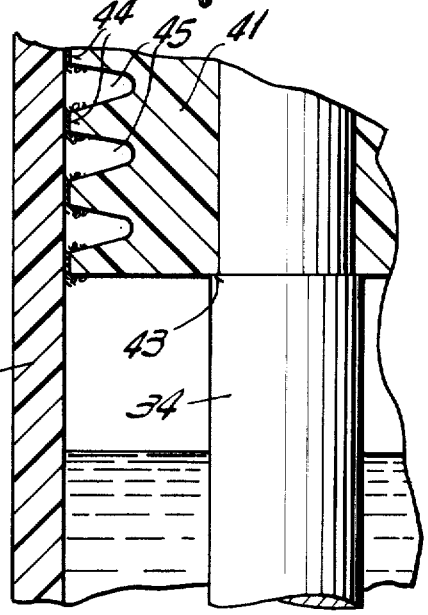
FIG. 6 is an enlarged sectional view of the control member showing the ink adhering to the crest of the threads and disposed between the crest of the threads and the wall of the barrel.

While the helical thread can be formed on the inner wall of the barrel to cooperate with a smooth cylindrical wall on the stem, in the illustrated form of the invention the threads are formed on the surface of a member 41 clamped between a nut 42 and a shoulder 43 on the stem and cooperate with the smooth inner walls on the barrel. This form is presently preferred because it is easier to manufacture and assemble. As shown in the enlarged view of FIG. 6, the crest 44 of the threads is spaced slightly from the cylindrical inner wall so that when the device is inverted, the ink will pass into the space between the crest of the thread and wall. The space, for example, is in the order of 0.003+0.000 inch—0.001 inch. Due to the viscosity and surface tension of the ink, it will adhere, as indicated in said figures, to the crest and adjacent wall.

The root 45 of the threads provides a venting path to the upper end to cooperate with vent passage 32, 33 to vent the barrel in the position of FIG. 2 to enable the ink from the supply to flow by gravity and capillary action from the pen point as it moves over a writing surface.

Further, it has been discovered that with this construction should the pen be inadvertently inverted while the inner member is in the position of FIG. 2, the ink will not run down the helical threads. This is apparently due to the fact that the clearance between the pen and the tubular pen point is so slight as to be ineffective as a vent.

Should the pen, as shown in FIG. 2, be unused for a period of time sufficient to permit the ink to harden in the tip of the pen point, it is merely necessary to reciprocate the stem a few times by applying pressure to the button 26 and cause the needle to pass through the bore in the pen point a few times to remove the hardened ink and restart the flow of ink from the supply to the writing tip of the pen point.

It will be seen that the drafting pen of the present invention is simple to construct and operate, easy to clean and fill with ink, and does not bleed.

Variations and modifications may be made within the scope of the invention and portions of the improvements may be used without others.

I claim:

1. A drafting pen comprising a cylindrical barrel having an open upper end and a lower end constituting an ink storage portion closed by a portion of reduced diameter provided with a tubular pen point having a bore communicating with the ink storage portion of the barrel, means closing said open end and including vent means movable between open and closed positions, control means in the barrel above the ink storage portion having a portion, the outer diameter of which is slightly smaller than the inner diameter of the cooperating barrel portion, one of said portions being cylindrical and the other having a helical thread on the surface to receive and retain a film of ink between the crest of the threads and the cylindrical portion with the roots of the thread forming a venting passage, said venting means in open position permitting ink to flow from said pen point during a writing operation.

2. The invention as defined in claim 1 wherein the barrel has a smooth inner portion and the control means has the helical thread on the surface to cooperate therewith.

3. A pen comprising a cylindrical barrel having an open upper end and a lower end constituting an ink storage portion closed by a portion of reduced diameter provided with a tubular pen point having a bore communicating with the ink storage portion of the barrel, a control means including an inner member carried by the barrel comprising a bushing closing said open end and slidably supporting a stem having a vent passage, said vent passage being opened and closed in response to sliding of said stem, said stem having on an intermediate portion a member having a helical thread on the outer surface, the outer diameter of said member being slightly smaller than the inner diameter of the barrel to receive a film of ink between the crest of threads and the barrel with the roots of the thread forming a venting passage therethrough, the forward end of said stem having a needle extending through said tubular pen point, movement of the stem to open the vent causing the needle to be withdrawn within the pen point whereby ink is free to flow from the pen point whereby ink is free to flow from the pen point during a writing operation.

4. The invention as defined in claim 3 wherein said bushing has a bore closed by an apertured wall at the inner end, said bore has threads at the outer end, and said stem has a reduced end portion slidable in said apertured wall and provided with said vent passage, the end of the stem being secured to a button having an end flange and having threads to be threaded into the threads in the bore of the bushing, a sealing washer on said button to engage the end of the bushing when the button is threaded into the bushing and seals the vent passage, and a spring in said bore normally urging the stem and button to projected unsealing position when the button is unthreaded from said bore in the bushing.

5. A pen comprising a cylindrical barrel having an open upper end and a lower end constituting an ink storage portion closed by a portion of reduced diameter provided with a tubular pen point having a bore communicating with the ink storage portion of the barrel, a control means above said ink storage portion, said control means including an inner member carried by the barrel comprising a bushing disposed in said open upper end with a tight fit and having a bore closed by an apertured wall at the inner end, said bore having threads at the outer end, a stem having a reduced end portion slidable in said apertured wall and provided with a vent passage, the end of the stem being secure to a button having an end flange and having threads to be threaded into the threads in the bore of the bushing, a sealing washer of said button to engage the end of the bushing when the button is threaded into the bushing and seals the vent passage, a spring in said bore normally urging the stem and button to projected unsealing position, said stem having a member on an intermediate portion provided with a helical thread on the outer surface, the outer diameter of said portion being slightly smaller than the inner diameter of the barrel to receive and retain a film of ink between the crest of the threads and the barrel with the roots of the thread forming a venting passage, the forward end of said stem having a needle extending through said tubular pen point, the unthreading of the button from the threaded portion of the bushing releasing the stem for movement under said spring to remove the seal, vent the upper end of the stem and partially withdraw the needle within the pen point whereby the ink is free to flow from the pen point during a writing operation.

6. The invention as defined in claim 3 wherein the needle has helical grooves in its outer surface to permit free flow of ink to said tubular pen point and the edges of the grooves clean dry ink from said pen point during a cleaning operation.

*7. A drafting pen comprising: a barrel having an ink storage portion closed at one end where the barrel is provided with a tubular pen point having a bore communicating with the ink storage reservoir, control means in the barrel above the ink storage reservoir and having a portion, the outer diameter of which is slightly smaller than the inner diameter of the cooperating barrel portion, one of said portions being cylindrical and the other having a helical thread to receive and retain a film of ink between the crest of the thread and the cylindrical portion with the roots of the thread forming a venting passage, said venting passage permitting ink to flow from said pen point during the writing operation.*

*8. A drafting pen according to claim 7 wherein a stem extends through the barrel and is movable relative to the barrel in the axial direction, and wherein the control member is mounted on the stem and moves axially with the stem.*

*9. A drafting pen according to claim 8 wherein the stem projects out of one end of the barrel where it may be manually manipulated.*

*10. A drafting pen according to claim 8 wherein the stem carries a needle which aligns with the bore in the tubular pen point and passes through that bore as the stem is moved axially toward the tubular pen point.*

References Cited

The following references, cited by the Examiner, are of record in the patented file of this patent or the original patent.

UNITED STATES PATENTS

| | | | |
|---|---|---|---|
| 2,296,127 | 9/1942 | Wallace | 401—259 X |
| 3,286,695 | 11/1966 | Martin | 401—258 X |
| 2,795,211 | 6/1957 | Nichols | 401—240 |
| 3,423,156 | 1/1969 | Mutschler | 401—240 |
| 3,711,861 | 1/1973 | Lorenz et al. | 401—258 X |

FOREIGN PATENTS

| | | |
|---|---|---|
| 857,986 | 1/1961 | Great Britain. |

LAWRENCE CHARLES, Primary Examiner